United States Patent
Barchers (10) Patent No.: US 6,683,291 B2
(45) Date of Patent: Jan. 27, 2004

(54) OPTIMAL BEAM PROPAGATION SYSTEM HAVING ADAPTIVE OPTICAL SYSTEMS

(75) Inventor: Jeffrey D. Barchers, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 237 days.

(21) Appl. No.: 10/004,028

(22) Filed: Nov. 14, 2001

(65) Prior Publication Data

US 2003/0089838 A1 May 15, 2003

(51) Int. Cl.[7] .................................................. G01J 1/20
(52) U.S. Cl. ..................................... 250/201.9; 250/216
(58) Field of Search ........................... 250/201.9, 201.3, 250/216; 356/49, 451, 488, 499; 359/10, 11, 16

(56) References Cited

U.S. PATENT DOCUMENTS 5,557,431 A * 9/1996 Pepper ......................... 359/10

OTHER PUBLICATIONS

Barchers, J. D., "Closed loop stable control of two deformable mirrors for compensation of amplitude and phase fluctuations," submitted for publication in the *Journal of the Optical Society of America A.*, Jul., 2001.

* cited by examiner

*Primary Examiner*—Que T. Le
(74) *Attorney, Agent, or Firm*—James M. Skorich; Kenneth E. Callahan (57) ABSTRACT

A method for maximum power transmission through a turbulent medium using the minimum size telescope aperture. Two telescopes are both equipped with an adaptive optical system to correct the aberrations observed on the received beam, at the same time pre-compensating an outgoing laser beam for the effects of atmospheric turbulence. By iterating back and forth between the planes of the two telescopes, maximum power is transmitted between the two telescopes.

3 Claims, 11 Drawing Sheets

OPTIMAL BEAM PROPAGATION SYSTEM HAVING ADAPTIVE OPTICAL SYSTEMS

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND

The present invention is in the field of adaptive optical systems, and in particular, relates to the control of electromagnetic fields propagated from a transmitting telescope to a receive telescope through a turbulent medium.

Adaptive optical systems are an enabling technology for a wide range of applications. Adaptive optical systems provide a means to compensate for the amplitude and phase fluctuations that result from electromagnetic wave propagation through a turbulent medium. Adaptive optical systems utilize a wavefront sensor to measure the amplitude and phase distortions observed on a wavefront sensing beacon and use these measurements to apply a set of phase commands to one or more phase correction devices to compensate for the effects of turbulence on propagation of electromagnetic waves. These systems have seen great success in astronomical telescopes, obtaining nearly diffraction-limited images for large (greater than 3-meter aperture diameter) telescopes. These successes, however, have been achieved at high elevation angles (within 60° of zenith), where only the phase fluctuations that result from propagation through turbulence are significant. In this case, only a single-phase correction device, typically a continuous facesheet deformable mirror, is required to compensate for the phase fluctuations.

At lower elevation angles, and in horizontal path applications, the amplitude fluctuations and anisoplanatic considerations become significant. Horizontal path applications, such as the U.S. Air Force's Airborne Laser Program and, in the commercial arena, free space optical communications and quantum cryptography, have become popular recently. These applications have encouraged the development of advanced adaptive optical systems that can compensate for both amplitude and phase fluctuations that result from propagation through a turbulent medium (See pending application Ser. No. 09/682,146 filed Jul. 26, 2001, now U.S. Pat. No. 6,452,146, entitled, "Electro-Optical Field Conjugation Systems," and herein incorporated by reference and Barchers, J. D., "Closed loop stable control of two deformable mirrors for compensation of amplitude and phase fluctuations," submitted for publication in the *Journal of the Optical Society of America A.*, July, 2001.) Power beaming to aerospace platforms at low elevation angles is another subject of recent interest.

In such applications as power beaming and horizontal path optical communication, an adaptive optical system in the transmitting telescope is used to pre-compensate a coherent laser beam to maximize the power collected by a receive telescope. It has been widely assumed that the optimal wavefront-sensing beacon for use in measuring the effects of atmospheric turbulence is a point source beacon. This bias is largely due to the fact that state of the art adaptive optical systems, such as that under development for the Airborne Laser Program, have largely been developed by the military industrial complex in which the objective of an adaptive optical system is to maximize the power density in a very small area on a target at a long range. For applications in which the objective is to maximize the received power in a collecting bucket (i.e., aperture), it is not obvious that this is the correct approach. The present invention defines the optimal approach to maximize received power in a collecting aperture and establishes that in fact, the optimal approach is not unreasonable to implement.

SUMMARY

In a preferred embodiment, the invention provides a means for maximum transmission of power between two telescopes. The invention requires that each telescope have an adaptive optical system capable of correcting at least the phase errors that result from propagation through a turbulent medium, although correction of both amplitude and phase errors is preferred. Maximum power transmission is achieved by correcting the observed phase aberrations in each telescope and applying these same corrections to the beam propagated towards the respective "other" telescope. This leads to a natural iteration, which converges towards a solution that maximizes the received power in each telescope. The significant benefit is the reduction of the required aperture size of each telescope by a factor of more than 100 when compensation of both amplitude and phase fluctuations is used on both telescopes.

Other aspects and advantages of the present invention will become apparent from the following detailed description, taken in conjunction with the accompanying drawing, illustrating by way of example the principles of the invention.

BRIEF DESCRIPTION OF THE DRAWINGS

FIG. 2 presents an example of the square root of the amplitude distribution as a function of the number of iterations. FIG. 2a used one iteration, 2b used 5 iterations, and 2c used 10 iterations for the OBPS using full wave compensation on both telescopes.

FIG. 3 shows the performance, assuming a "frozen" turbulent medium, of the OBPS in several configurations as a function of the ratio of the aperture diameter of the two telescopes, D, to the Fresnel length, $(\lambda L)^{1/2}$, where $\lambda$ is the wavelength of propagation, and L is the distance between the two telescopes.

FIG. 4 presents several examples of the performance assuming a realistic time varying turbulent medium of the OBPS in the three configurations (full wave compensation on both telescopes; full wave compensation on one telescope with phase only compensation on the other; and phase only compensation on both telescopes) for values of $\sigma^2_{tof}$ equal to 4a: 0.1, 4b: 1.0, and 4c: 10.0.

DETAILED DESCRIPTION

1. Overview

The present invention is a new approach to the problem of maximizing power transmitted between two telescopes. The primary benefit of this approach is a significant reduction in the required aperture diameter of the telescopes to collect nearly the entire transmitted wave.

The conventional approach, taken for control of light propagated through a turbulent medium is to use a point (spherical wave) source, at a receive telescope as a wavefront sensing beacon for use by the transmitting telescope to pre-compensate a laser beam to maximize power transmitted to the receive telescope. In this invention, it is recognized that far superior performance and much smaller aperture diameters can be used, if the transmit and receive telescopes are each equipped with an adaptive optical system and the adaptive optical system is used to pre-compensate the beams propagated by both telescopes. This is achieved by iterating back and forth between the planes of the two telescopes by actually propagating beams back and forth between the two telescopes. The iteration is guaranteed to improve the power transmission, assuming a static turbulent medium.

There are, of course, physical limitations that prevent unit transmission in all cases. The first limitation is the diffraction limit. It is not possible to focus all of the energy inside of a λL/D diameter region due to the limitations imposed by diffraction. However, it turns out that the Optimal Beam Propagation System (OBPS), when equipped with full wave compensation systems on each telescope, can focus nearly all of the transmitted energy into a 4λL/D diameter region. The second limitation is the finite speed of light. Normally, this is not thought of as a limitation. However, if the wind velocities are high, or one or both of the two telescopes is in motion, then the turbulence observed along the propagation path can change greatly in a round trip travel time, leading to reduced efficacy of the iteration. These limitations have been evaluated to some extent and the results are included in this disclosure. An additional detailed discussion of the properties and performance of the OBPS is available in the following paper submitted for publication in the *J. Opt Soc. Am. A* in October, 2001: J. D. Barchers, "Optimal control of laser beams propagated through a turbulent medium."

A complete description of the OBPS follows. First, in Section 2, the OBPS is described and an example result is provided for a static turbulence profile. Section 3 discusses the limitations imposed by diffraction and Section 4 discusses the limitations imposed by the finite speed of light. Section 5 summarizes the benefits obtained by use of the OBPS.

2. The Optimal Beam Propagation System.

Figure 1:
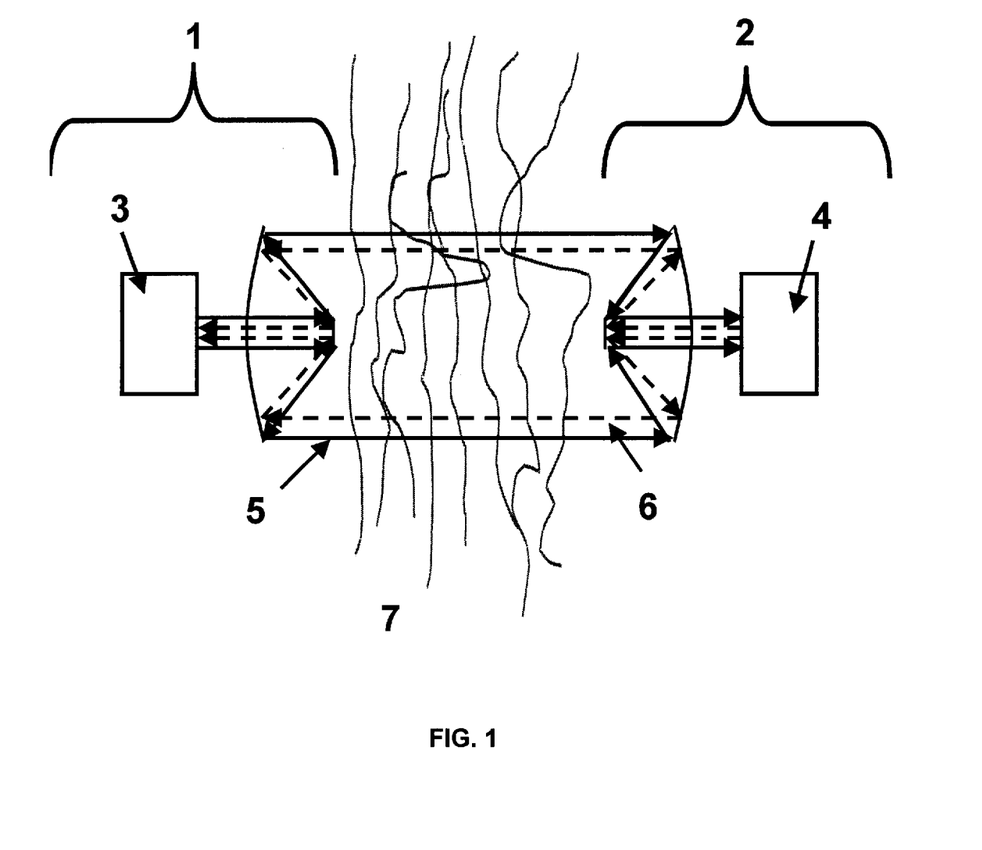
FIG. 1 depicts the approach for the Optimal Beam Propagation System (OBPS).

The purpose of the optimal beam propagation system is to maximize the power transmitted between a pair of telescopes. The general approach is illustrated in FIG. 1. The first telescope 1 propagates a beam 5 towards the second telescope 2 through the turbulent medium 7. At this point, the second telescope activates its adaptive optical system 4 to correct the received beam 5, simultaneously pre-compensating the beam 6 to propagate back through the turbulent medium 7. All the while, the first telescope continues to propagate the beam 5. The second telescope 2 and adaptive optical system 4 continues to correct the beam 5 and pre-compensate the beam 6. Upon first receiving the beam 6, the first telescope activates its adaptive optical system 3 to correct the beam 6 and begin pre-compensating the beam 5 for propagation through the turbulent medium 7. At this point, both telescopes are transmitting and receiving beams and the iteration to maximize power transmitted between the telescopes has begun. The adaptive optical systems continue to operate, compensating the received beams and pre-compensating the outgoing beams. Each round trip travel time constitutes an "iteration" which improves the power transmitted between the two telescopes.

In order to gain an understanding of why the iteration back and forth between the two planes of the telescopes occurs, we turn to the method of sequential projections onto constraint sets. In the method of sequential projections onto constraint sets, two constraint sets, C and D, in a Hilbert space, H, are defined. Both sets can be convex or non-convex. A convex set is one in which, given any two points within said convex set, the line connecting the two points is also contained in the set. As an example, the set describing the unit ball in a Hilbert space, $$C=\{x \in H | \|x\| \leq 1\},$$

is a convex set whereas the set describing the boundary of the unit ball in a Hilbert space, $$C=\{x \in H | \|x\|=1\},$$

is non-convex.

Returning to our arbitrary constraint sets, C and D, given any vector, x, in the Hilbert space, H, it is possible to describe the projections onto the constraint sets by, $$P_C x = \underset{x \in C}{\mathrm{argmin}} \|P_C x - x\| \qquad (\text{Eq. 1})$$

$$P_D x = \underset{x \in D}{\mathrm{argmin}} \|P_D x - x\|$$

Given the projections onto C and D, iteratively applying the projections, i.e., $$x_{k+1} = P_C P_D x_k,$$

is guaranteed, by the Levi-Stark theorem, to reduce the cost function, $$J(x_k) = \|P_C x_k - x_k\| + \|P_D x_k - x_k\| \qquad (\text{Eq. 2})$$

This cost function will be shown for the optimal beam propagation system to be a descriptor of the power transmitted between the two telescopes.

Consider assigning a constraint set to represent the capability of the adaptive optical system in each telescope. Define the vector $U(r_1)$, where $r_1$ are the coordinates in the plane of the first telescope, to represent the complex field in the plane of the first telescope. If the first telescope is capable of only phase only compensation, then at the plane of the first telescope, $U(r_1)$ is constrained to have a fixed amplitude profile with a finite support, as described by the following constraint set, $$C_{PO}=\{U(\overline{r_1}) \in H | |U(\overline{r_1})|=1 \forall |\overline{r_1}| \leq R_1 \text{ and } U(\overline{r_1})=0 \text{ otherwise}\} \quad (\text{Eq. 3})$$

where $R_1$ is the radius of the first telescope. If the adaptive optical system in the first telescope is capable of both amplitude and phase compensation, then $U(r_1)$ is constrained to have finite support at the plane of the first telescope, as described by the following constraint set, $$C_{AP}=\{U(\overline{r_1}) \in H | U(\overline{r_1})=0 \forall |\overline{r_1}|>R_1\}. \qquad (\text{Eq. 4})$$

Constraints on $U(r_1)$ can also be defined in terms of the adaptive optical system in the second telescope. These constraints are defined in terms of the ideal complex field vector that would achieve maximum power transmission for the given capability of the adaptive optical system in the plane of the second telescope. Define the operator $T_A[.]$ as the series of propagations and phase screens, neglecting a constant atmospheric attenuation term that the turbulent medium imparts on a complex field as it passes through the turbulent medium. The operator $T_A[.]$ is a composition of unitary operators, and is therefore itself a unitary operator. Note that the vector $T_A[U(r_1)]$ is in the plane of the second telescope and the associated coordinates are now described by $r_2$. Thus for notational completeness, we use $T_A[U(r_1),r_2]$ to represent the field $U(r_1)$ propagated through the turbulent medium to the plane of the second telescope. If the adaptive optical system in the plane of the second deformable mirror is capable of only phase compensation, then a finite support and phase only constraint is applied in the plane of the second telescope, as described by the following, $$D_{PO} = \{U(\bar{r}_1) \in H | |T_A[U(\bar{r}_1), \bar{r}_2]| = 1 \forall |\bar{r}_2| \leq R_2 \text{ and } T_A[U(\bar{r}_1), \bar{r}_2] = 0 \text{ otherwise}\} \quad \text{(Eq. 5)}$$

where $R_2$ is the radius of the aperture of the second telescope. The members of the set, $D_{PO}$, represent the control vectors that would achieve maximum power transmission to the plane of the second telescope if the second telescope's adaptive optical system is only capable of phase correction. If the adaptive optical system at the second telescope is capable of both amplitude and phase correction, then the constraint is only on the support in the plane of the second telescope, $$D_{AP} = \{U(\bar{r}_1) \in H | T_A[U(\bar{r}_1), \bar{r}_2] = 0 \forall |\bar{r}_2| > R_2\} \quad \text{(Eq. 6)}$$

The projections onto the various constraint sets are not difficult to derive (and are physically realizable simply by applying the adaptive optical system associated with each telescope) due to the fact that the propagation through a turbulent medium is a unitary operator. The projections onto the constraint sets are given by, $$P_{C,PO}[U(\bar{r}_1)] = \begin{cases} \exp[i \arg U(\bar{r}_1)] & \forall \bar{r}_1 \leq R_1 \\ 0 & \text{otherwise} \end{cases} \quad \text{(Eq. 7)}$$

$$P_{C,AP}[U(\bar{r}_1)] = \begin{cases} U(\bar{r}_1) & \forall \bar{r}_1 \leq R_1 \\ 0 & \text{otherwise} \end{cases} \quad \text{(Eq. 8)}$$

$$P_{D,PO}[U(\bar{r}_1)] = T_A^*[U_{2,PO}(\bar{r}_2)] \quad \text{(Eq. 9)}$$

$$P_{D,AP}[U(\bar{r}_1)] = T_A^*[U_{2,AP}(\bar{r}_2)] \quad \text{(Eq. 10)}$$

where $$P_{2,PO}(\bar{r}_2) = \begin{cases} \exp\{i \arg T_A[U(\bar{r}_1), \bar{r}_2]\} & \forall \bar{r}_2 \leq R_2 \\ 0 & \text{otherwise} \end{cases} \quad \text{(Eq. 11)}$$

$$U_{2,AP}(\bar{r}_2) = \begin{cases} T_A[U(\bar{r}_1), \bar{r}_2] & \forall \bar{r}_2 \leq R_2 \\ 0 & \text{otherwise} \end{cases} \quad \text{(Eq. 12)}$$

The projections associated with the first telescope can simply be viewed as applying the adaptive optical system of the first telescope. The projections associated with the second telescope can be viewed as: propagate a beam from the first telescope, apply the adaptive optical system of the second telescope to the received beam, and then propagate a beam back to the first telescope based on the correction applied by the adaptive optical system in the second telescope.

Having defined projections associated with the adaptive optical system of each telescope, we can see that iteratively applying the projections, simply by propagating back and forth between the planes of the two telescopes, will reduce the following cost functional, $$J[U(\bar{r}_1)] = \|P_C U(\bar{r}_1) - U(\bar{r}_1)\| + \|P_D U(\bar{r}_1) - U(\bar{r}_1)\| \quad \text{(Eq. 13)}$$

Assuming that a beam has been received from the second telescope, the beam $U(r_1)$ can be viewed as a member of the set D, or the ideal field that will achieve unit power transmission to the second telescope, thus the second term in Eq. 13 goes to zero. However, this $U(r_1)$ is not realizable due to the finite size of the first telescope and the limitations of the first telescope's adaptive optical system. At this point, the remaining cost functional, $$J[U(\bar{r}_1)] = \|P_C U(\bar{r}_1) - U(\bar{r}_1)\| \quad \text{(Eq. 14)}$$

has an interesting physical interpretation. It represents the required change in the first telescope's adaptive optical system's capability to achieve unit transmission to the second telescope. Because iteratively applying the projections onto the constraint sets associated with each telescope monotonically reduces the value of Eq. 14, the reduction in the cost functional, J, leads to a more and more realizable desired outgoing beam in the plane of the first telescope. In this application, more and more realizable corresponds to increasing the amount of power collected by the first telescope aperture (and the spatial coherence of the received beam, if the first telescope's adaptive optical system is only capable of phase compensation). A similar series of statements can be made concerning the amount of power collected by the second telescope. Hence, given a fixed turbulence profile, the iteration between the two telescopes monotonically increases the power collected by each aperture, achieving the desired effect.

A demonstration of the OBPS using wave optical simulation is provided in FIG. 2. The scenario is a pair of telescopes with equal aperture diameters, and the ratio of the aperture diameter, D, to the Fresnel length, $(\lambda L)^{1/2}$, where $\lambda$ is the wavelength of propagation, and L is the distance between the two telescopes, is set equal to 2. The turbulence is taken to be fixed, or frozen in time. The value of $D/r_0$ is set equal to 5.33, where $r_0$ is the Fried coherence length (which is heuristically the largest size telescope diameter in which nearly diffraction limited imaging performance can be obtained, thus poor performance is expected unless an adaptive optical system is used for our example of $D/r_0 = 5.33$). The corresponding value of the Rytov number is 0.782. The Rytov number is a fundamental scaling parameter for propagation through atmospheric turbulence and is also an estimate of the strength of the amplitude fluctuations. A value of 0.782 is considered quite high and well into what is known as the "strong scintillation" regime (which most consider to begin at approximately a value of 0.2).

Figure 2A:
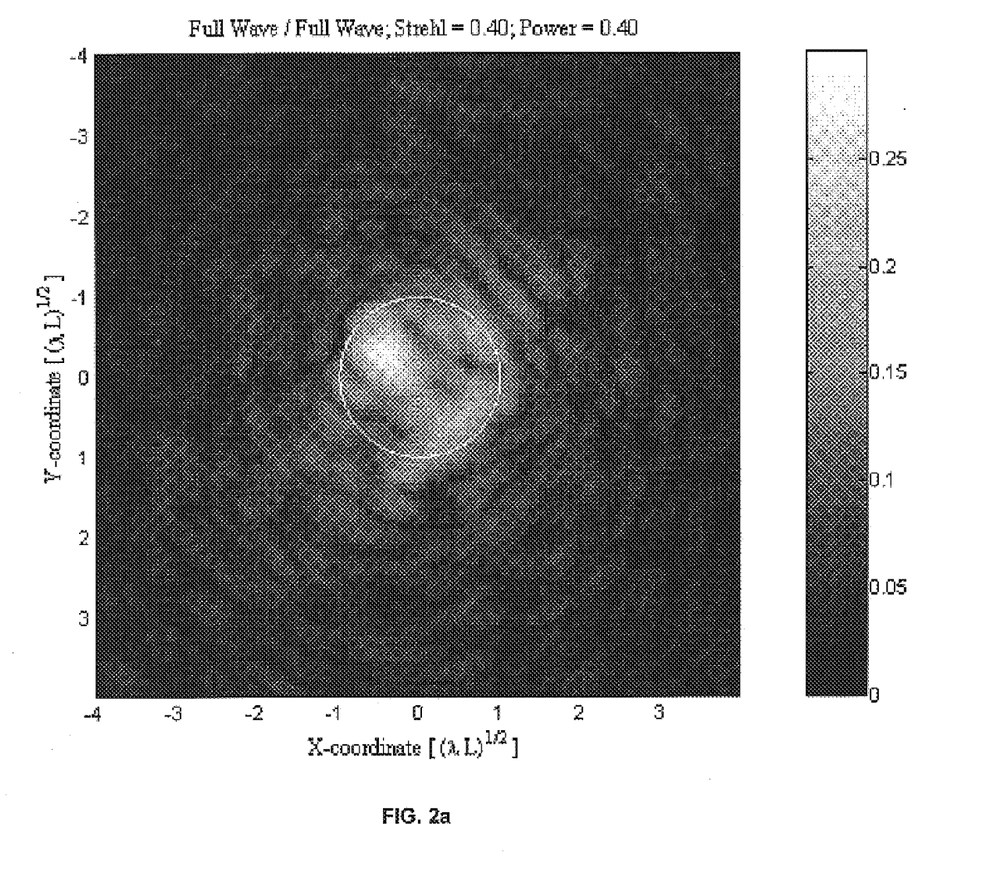
Figure 2B:
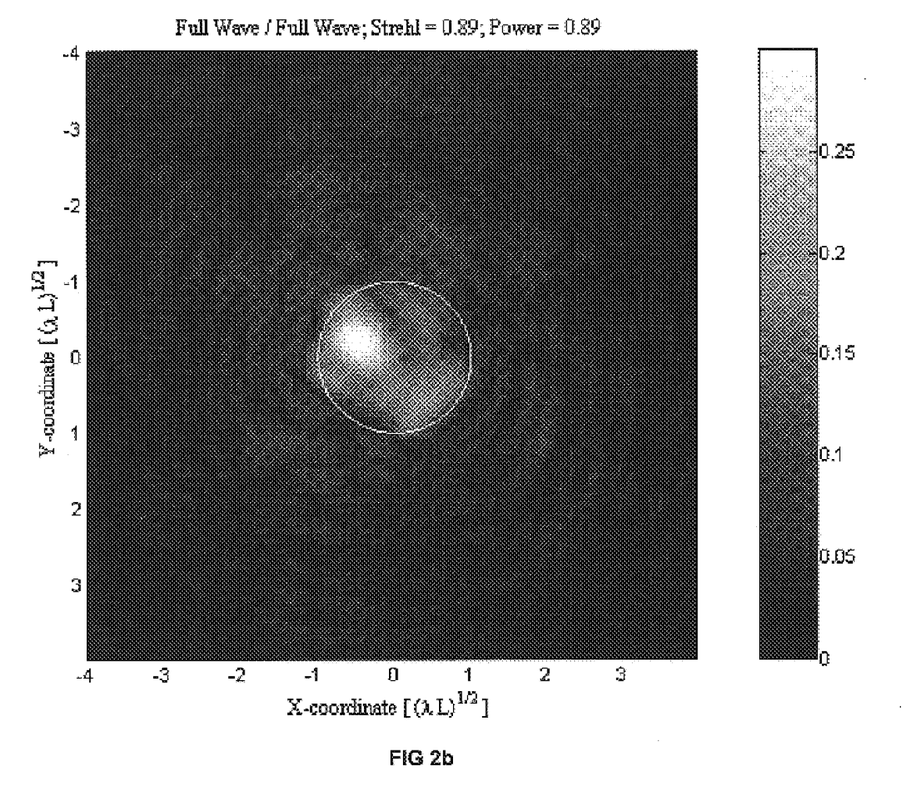
Figure 2C:
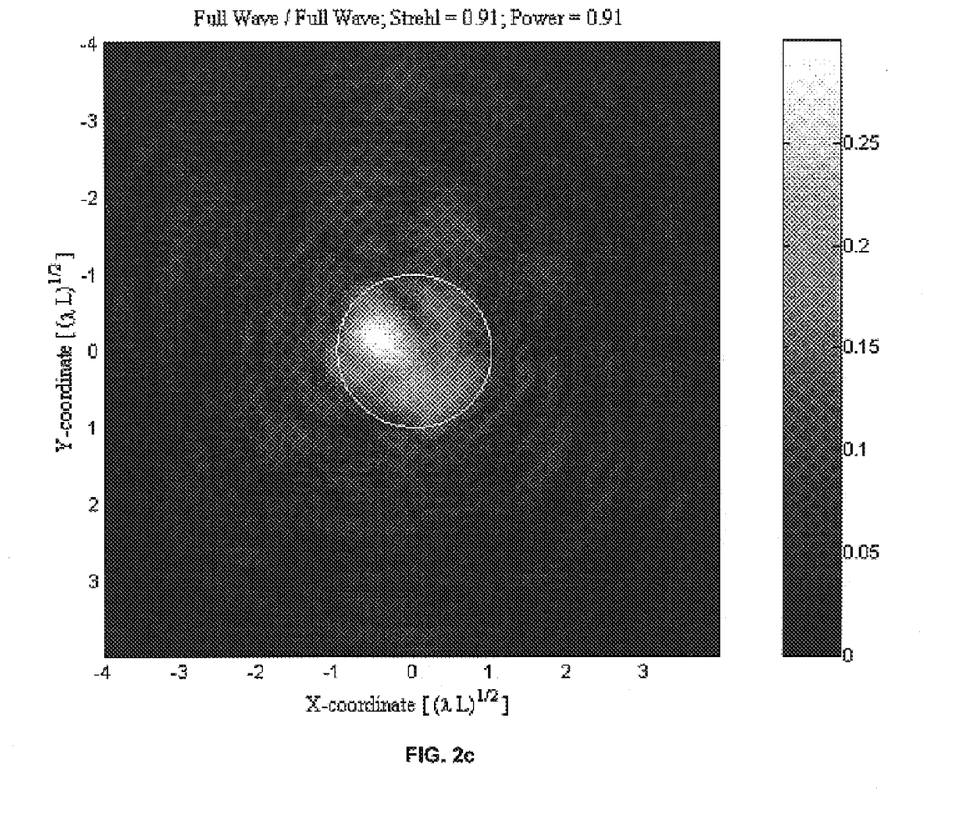
Figure 2D:
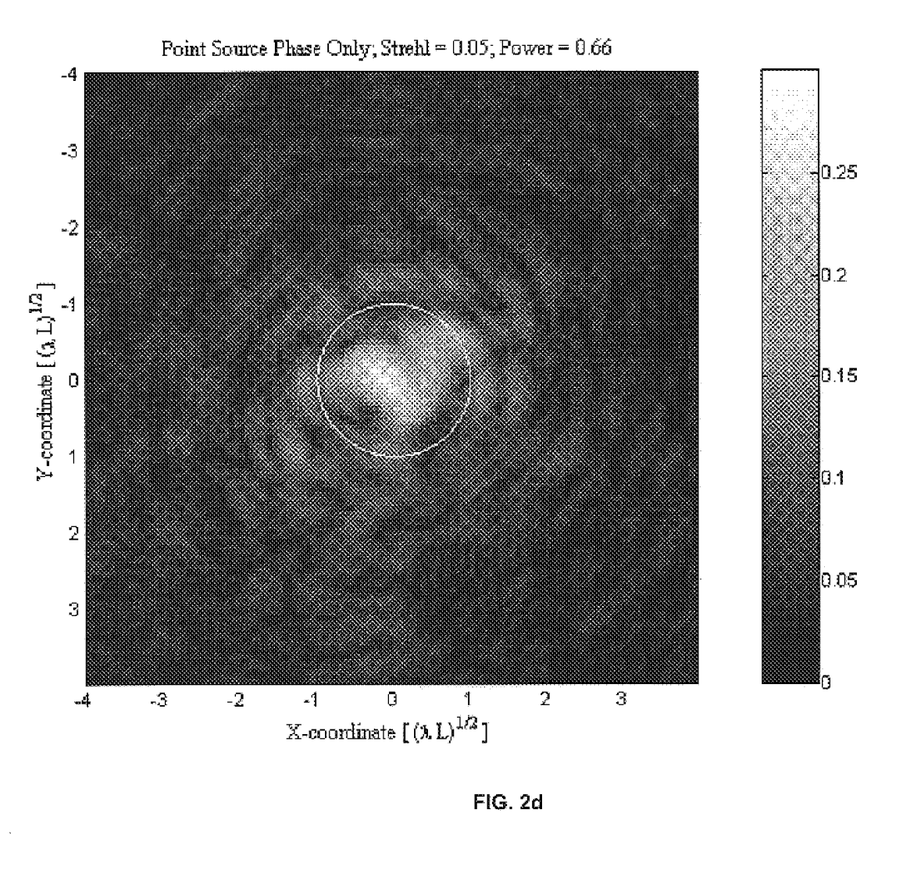
FIG. 2d shows for comparison purposes the results for conventional adaptive optics used with a point reference source. The white circle drawn in the center of each image is the receive aperture diameter.

Shown in FIG. 2(d) is the square root of the amplitude (fourth root of the intensity) distribution at the plane of the second telescope if one uses a point source for wavefront sensing and uses phase only compensation to precompensate the laser beam transmitted from the first telescope. The fourth root of the intensity distribution is used to emphasize the result in a grayscale visualization. Shown in FIGS. 2(a–c) is the square root of the amplitude distribution at the plane of the second telescope if the OBPS procedure is used with amplitude and phase compensation on both telescopes after 1, 5, and 10 iterations. An iteration consists of a full round-trip from the second to the first to the second telescope; the initial beacon propagated from the second telescope fills the aperture and is collimated with no precompensation. Two metrics are included with each sub-plot. The first is the normalized power collected by the second telescope (power in bucket). This is simply the ratio of the received power to the transmitted power. The second is the normalized Strehl ratio associated with the received field at the second telescope. The Strehl ratio is given by, $$S = \frac{\left|\int d\vec{r}_2 T_A[U(\vec{r}_1), \vec{r}_2] M_2(\vec{r}_2)\right|^2}{\left|\int d\vec{r}_1 |U(\vec{r}_1)|^2\right| \left|\int d\vec{r}_2 |M_2(\vec{r}_2)|^2\right|} \quad \text{(Eq. 15)}$$

where $M_2(r_2)$ is a mask of 1's and 0's describing the extent of the clear aperture of the second telescope. The Strehl ratio, as it is defined here, is to be interpreted as the fraction of spatially coherent laser light collected by the second telescope. Thus if the power in the bucket is reasonable, but the Strehl ratio is low, then although some energy was collected, without an adaptive optical system to clean up the phase aberrations on the received beam, one could not actually do anything useful with the light. This is clearly the case for the conventional approach (phase only compensation of a point source beacon) shown in FIG. 2(d). It is also quite clear that the OBPS achieves a significant increase in the energy collected at the second telescope. One should note that the power in the bucket is equal to the Strehl ratio for the OBPS because it is assumed that full wave compensation of both amplitude and phase fluctuations is used for the OBPS on both telescopes.

3. Minimum required aperture diameter for the Optimal Beam Propagation System

Although the results shown in FIG. 2 illustrate that the concept has promise, there are some practical considerations that are of note. The first is the minimum required aperture diameter of the telescopes for the OBPS to be effective and the second (examined in Section 4) is the phase variance associated with phase errors that occur on a round trip travel time due to the finite speed of light.

Figure 3A:
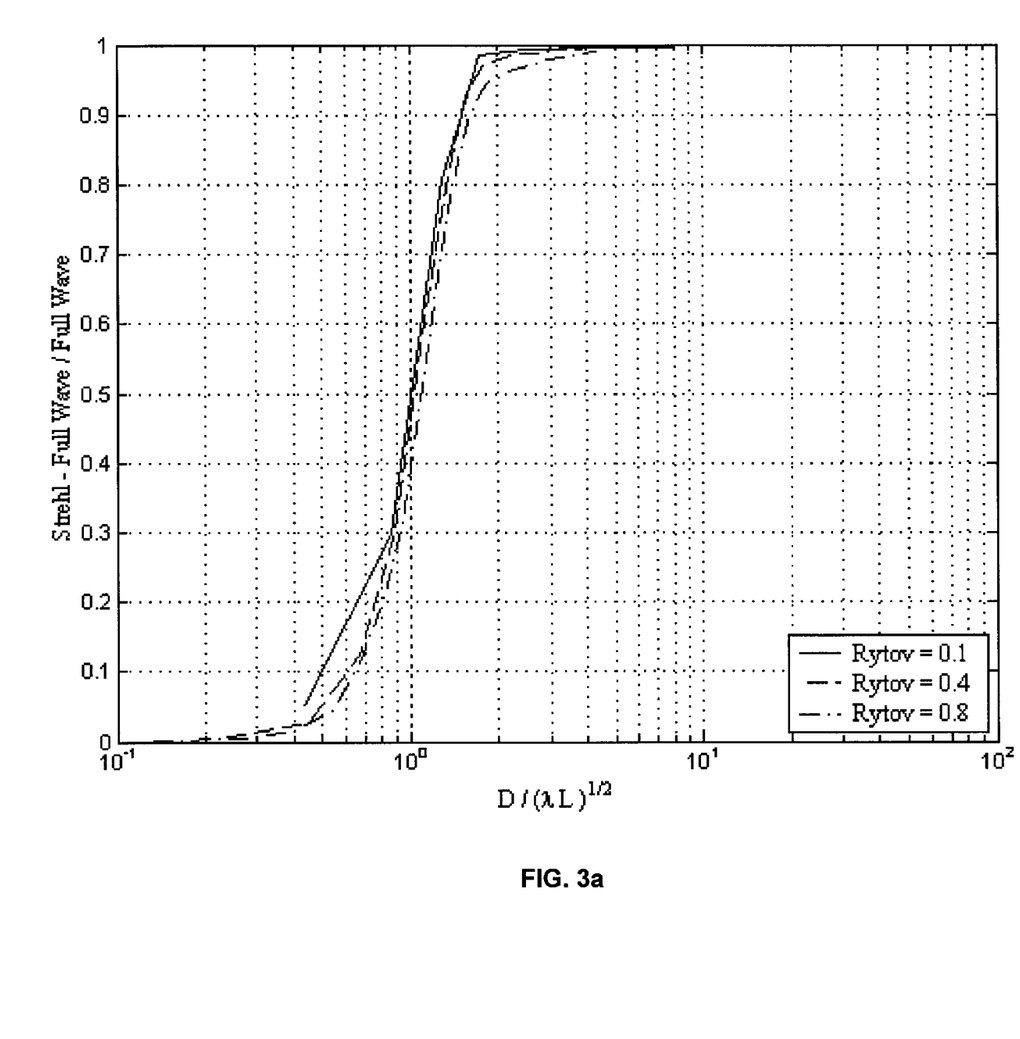
FIG. 3a is a plot for full wave compensation on both telescopes.
Figure 3B:
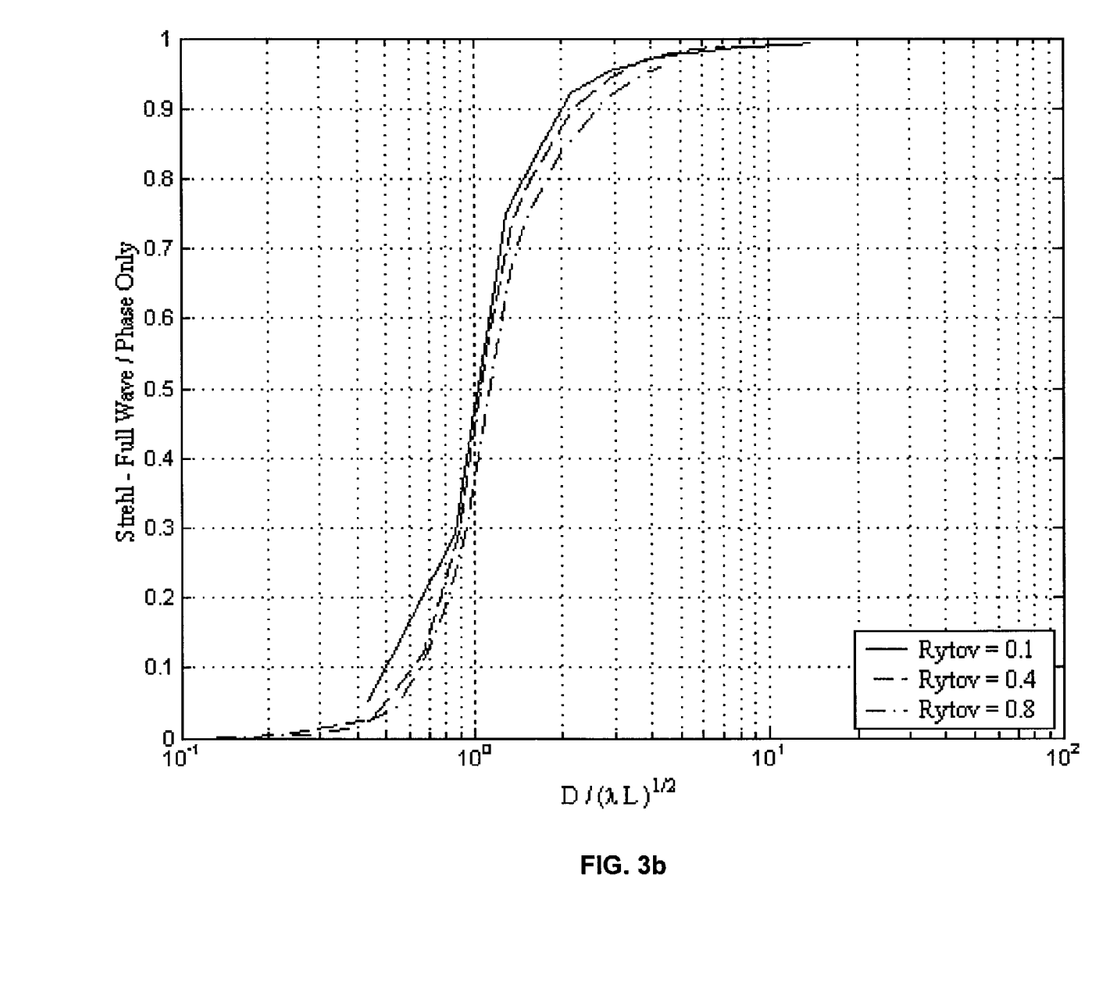
FIG. 3b is a plot for full wave compensation on one telescope with phase only compensation on the other.
Figure 3C:
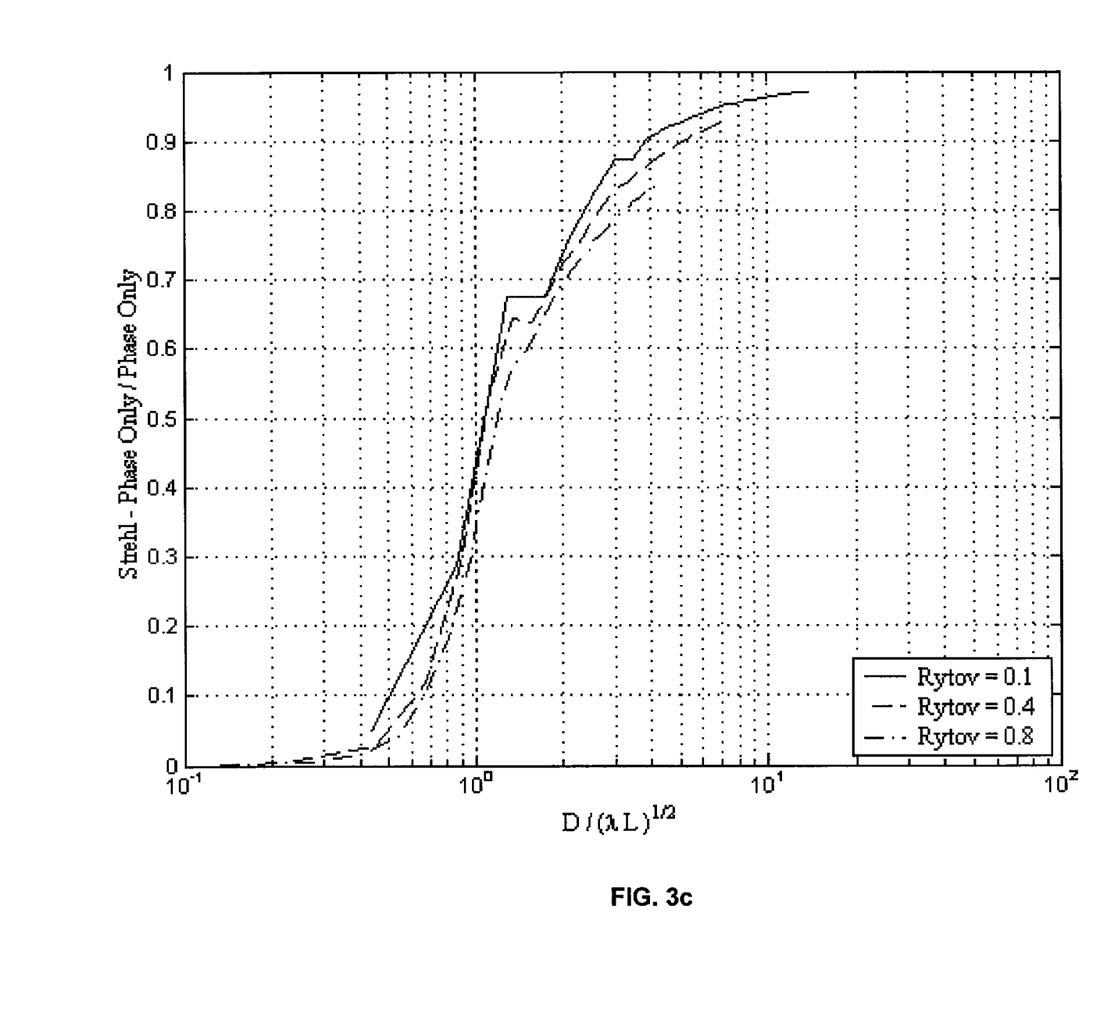
FIG. 3c is a plot for phase only compensation on both telescopes.

The first limitation was explored by means of extensive wave optical simulation. For a frozen turbulence realization, and for a range of values of the Rytov number, the ratio of the aperture diameter to the Fresnel length was adjusted and several different approaches were evaluated. Three variations of the OBPS were considered. The first variation is the OBPS with full wave compensation on both telescopes. The second is the OBPS with full wave compensation on the first telescope and phase only compensation on the second telescope. The third is the OBPS with phase only compensation on both telescopes. Shown in FIG. 3a–c is the performance (Strehl ratio) of each of these three approaches for some sample values of the Rytov number as a function of the ratio of the aperture diameter to the Fresnel length. It is important to note that the Strehl ratio values shown are direct measures of the useful power transmitted between the two telescopes.

Typically, one assumes a further loss on top of the Strehl ratio, which is inversely proportional to the square of the propagation distance. One of the significant advantages of the OBPS is the elimination of the $1/L^2$ dependence in the performance of the beam projection system. It is quite obvious that using full wave compensation on both telescopes provides a tremendous advantage in terms of the minimum required aperture diameter for maximum power transmission. For the first approach (full wave compensation on both telescopes, see the plot in FIG. 3a) the minimum required value of $D/(\lambda L)^{1/2}$ to achieve 95% power transmission is 2.

For the second approach where one telescope uses phase only compensation and the second uses full wave compensation (FIG. 3b), and for the largest value of the Rytov number, the minimum value of $D/(\lambda L)^{1/2}$ to achieve 95% transmission is equal to 4.

For the third approach where both telescopes are corrected for phase only, the 95% level is not been reached for all values of the Rytov number and only an estimate based on extrapolation can be made of the minimum value of $D/(\lambda L)^{1/2}$ to achieve 95% power transmission (see FIG. 3c). Note that unless full wave compensation is used on both telescopes, performance has a significant dependence on the Rytov number. This is simply due to the limitations associated with phase only compensation. For the largest value of the Rytov number, if both telescopes use phase only compensation, then the minimum value of $D/(\lambda L)^{1/2}$ is estimated to be at least 25–50. This represents a very significant reason to require the use of full wave compensation for at least one of the adaptive optical systems used in the OBPS, as the telescope diameter is a very significant design driver for any system.

4. The effect of the finite speed of light on the performance of the Optimal Beam Propagation System The second limitation is the phase error that results from changes in the turbulence during a round trip travel time of the light. This has also been evaluated via numerical simulation. However, prior to presenting any simulation results, we develop a fundamental quantity representing the phase variance associated with the change in turbulence over a round trip travel time of the light. This fundamental quantity shall be taken to be an indicator of the effect of the finite speed of light on the iterative procedure. We assume that light propagates geometrically. Note that the development is easily generalized to any scintillation regime by taking advantage of the invariance with propagation of the mutual coherence function. In order to define this fundamental quantity in keeping with other fundamental scaling parameters, we choose to use the geometric optics approximation. Consider an infinite plane wave propagating from the top of a turbulent medium to the bottom. The integrated phase on this beam is denoted by $\phi_{rcv}$. Immediately upon receiving the beam, an infinite beam with initial phase equal to $\phi_{rcv}$ is propagated back from the bottom of the turbulent medium to the top. As the beam propagates back through the medium, it accrues a phase error whose integrated phase variance can be defined by the phase structure function along the propagation path, $$\sigma_{tof}^2 = \int_0^L dz \, 6.88 \left[\frac{v(z)2z}{cr_0(z)}\right]^{5/3} \quad \text{(Eq. 16)}$$

where v(z) is the wind velocity as a function of altitude (turbulence is assumed to change with time according to the Taylor frozen flow hypothesis, which assumes that layers of turbulence move with the prevailing mean wind). As $$r_0^{-5/3}(z) = \frac{2.91}{6.88} k_0^2 C_n^2(z),$$

where $k_0 = 2\pi/\lambda$ is the wavenumber and $C_n^2(z)$ is a measure of the turbulence strength along the path, one can write the phase variance due to time of flight as a typical $C_n^2(z)$ integral, $$\sigma_{tof}^2 = 2.91 \left(\frac{2}{c}\right)^{5/3} k_0^2 \int_0^L dz [v(z)z]^{5/3} C_n^2(z) \quad \text{(Eq. 17)}$$

The return wave Strehl loss due to time of flight would be roughly proportional to $\exp(-\sigma_{tof}^2)$. This is true for the geometric optics case and roughly true for the wave optical propagation case. Although this represents the expected Strehl loss due to time of flight for the non-iterative case, it is not clear what exact effect the finite speed of light will have on the iterative OBPS. The expected effect is that as $\sigma^2_{tof}$ increases, the effectiveness of the iteration will be reduced.

Figure 4A:
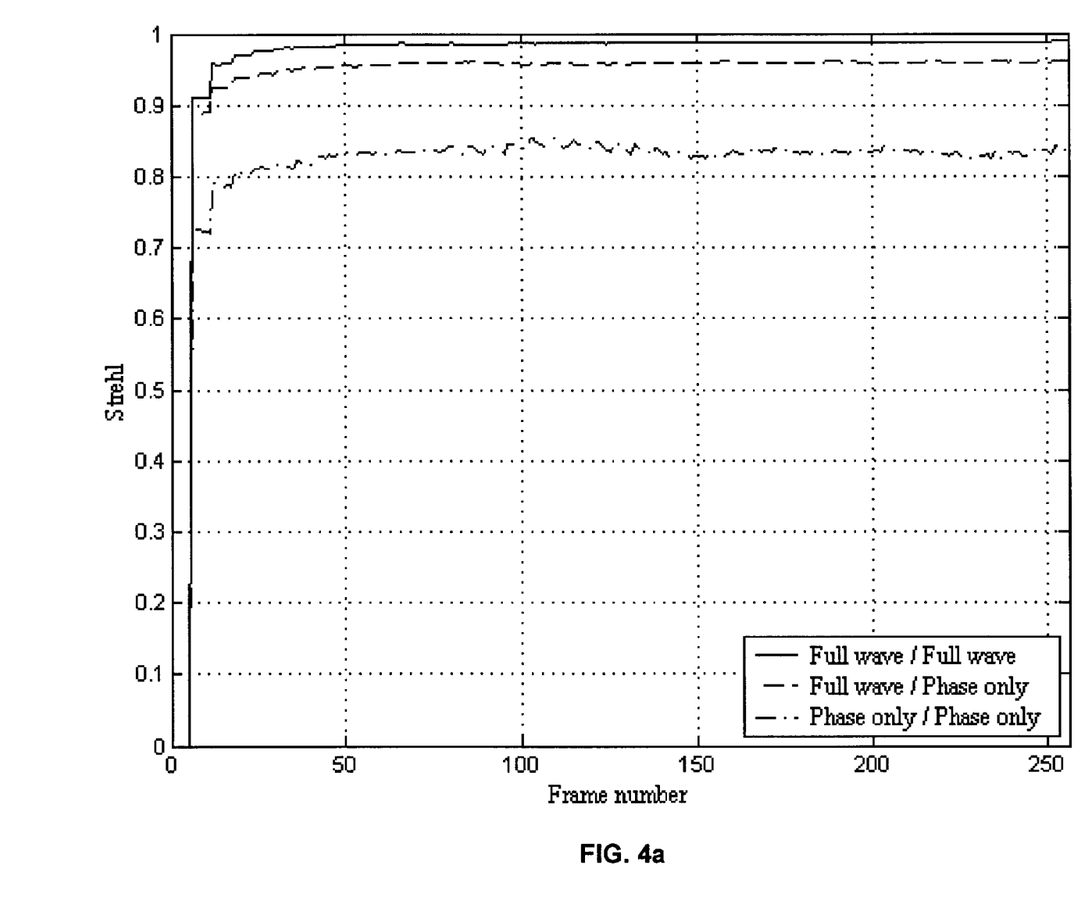
Figure 4B:
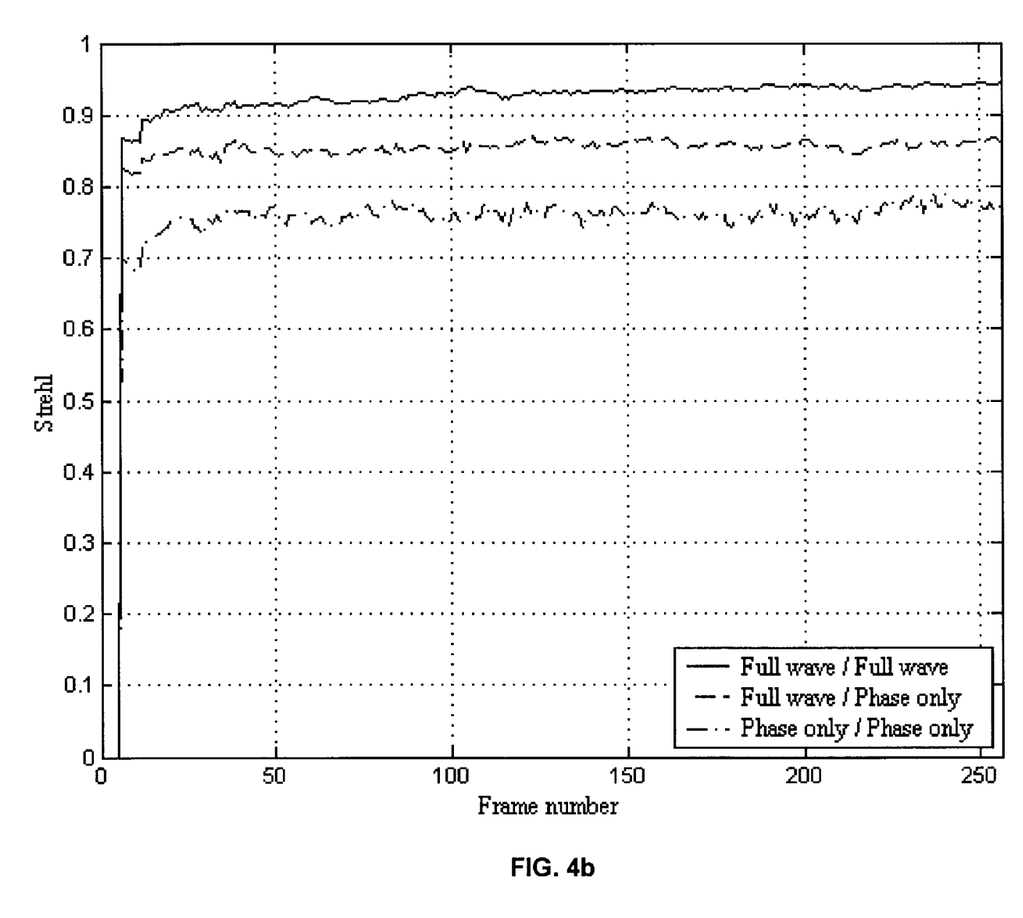
Figure 4C:
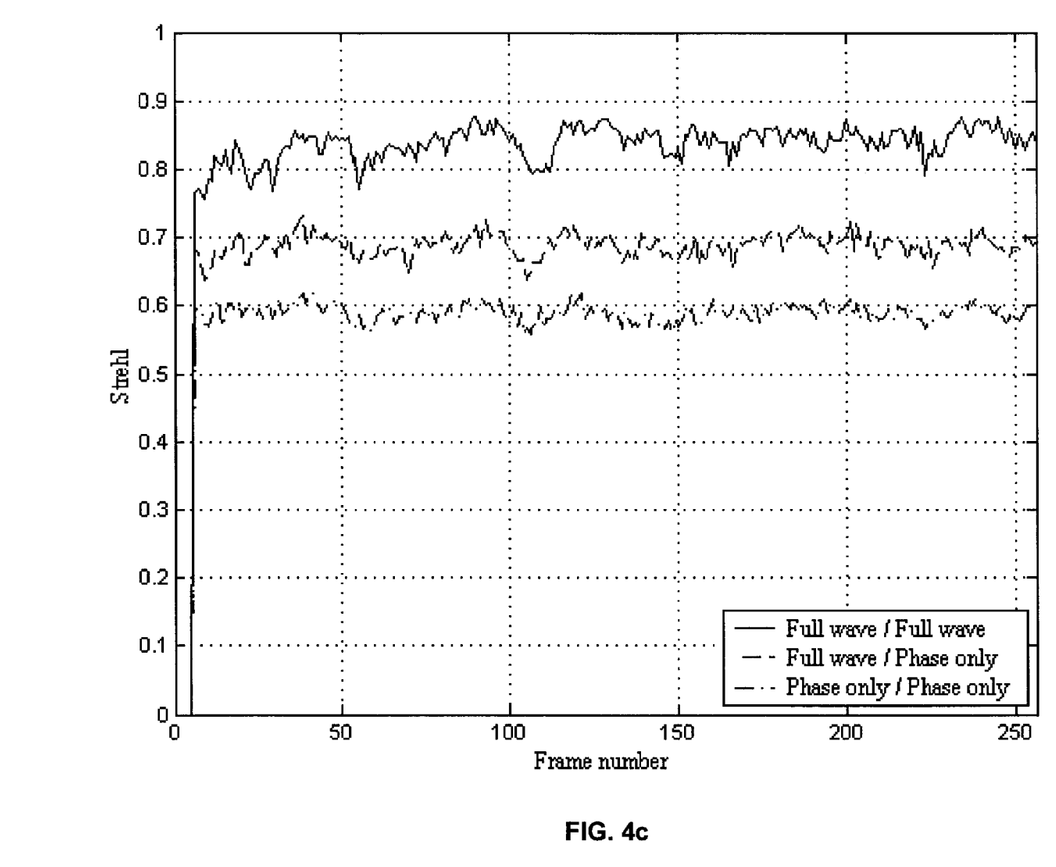

The effect of the finite speed of light on the performance of the OBPS was evaluated by numerical simulation for a value of $D/(\lambda L)^{1/2}$ equal to 3 for each of the three possible approaches (full wave compensation on both telescopes, full wave compensation on one telescope with phase only compensation on the other, and phase only compensation on both telescopes). FIGS. 4(a–c) displays an example time history of the Strehl ratio for the three approaches using $D/(\lambda L)^{1/2}$ equal to 3 for $\sigma^2_{tof}$ equal to (a) 0.1, (b) 1.0, and (c) 10.0. As expected, increasing the value of $\sigma^2_{tof}$ reduces performance of all three systems. The performance of the approaches that utilize at least one full wave compensation system is superior to the approach of utilizing a pair of phase only compensation systems.

5. Advantages of the Optimal Beam Propagation System

The OBPS provides a unique capability, particularly when used with full wave compensation on both telescopes. The OBPS achieves a significant tightening of the beam transmitted and received. The most significant advantage provided by the OBPS is that a much smaller aperture diameter can be used to collect a very significant amount of power. The OBPS uses diffraction effects as the beams propagate through the turbulent medium to achieve this effect. The OBPS has commercial potential for both horizontal path free space optical communication and power beaming to relatively low altitude aerospace platforms (less than 100 km—before the phase variance due to time of flight becomes significant). As an example, consider a pair of telescopes only 30 cm in diameter, both equipped with adaptive optical systems capable of full wave compensation. For the standard telecommunications wavelength of 1.5 µm, the requirement that $D/(\lambda L)^{1/2}$ be greater than 2 implies a maximum propagation range of approximately 14 km—a very large distance! This distance is such that the effect of the finite speed of light is not expected to be significant.

A final potential advantage of the OBPS is in mitigation of thermal blooming. Although no numerical evaluations have been performed, it is expected that the OBPS, because it can capture and correct nearly the entire wave, will eliminate the effects of thermal blooming. This is due to the fact that if one captures the entire wave, then full wave compensation is found to yield stable control of thermal blooming.

What is claimed is:

1. In an optical power transmission system, a method for maximizing the power transmitted between a first and a second telescope separated by a turbulent medium, each telescope being equipped with an adaptive optical system that compensates for both amplitude and phase fluctuations that result from propagation through the turbulent medium, the method comprised of:

transmitting an uncorrected, collimated first beam from the first telescope through the turbulent medium to the second telescope;

receiving the first beam at the second telescope;

correcting the phase and amplitude fluctuations on the initial beam using an adaptive optical system on the second telescope while simultaneously pre-compensating a second beam for propagation back through the turbulent medium towards the first telescope;

receiving the second beam at the first telescope;

correcting the phase and amplitude fluctuations on the second beam using an adaptive optical system on the first telescope while simultaneously pre-compensating the first beam that continues to propagate towards the second telescope; and running continuously the adaptive optical systems on the first and second telescopes, whereby a natural iteration through the turbulent medium occurs that maximizes the power transmitted between the two telescopes.

2. The method for maximizing the power transmitted between a first and a second telescope of claim 1, wherein the adaptive optical system of the first telescope compensates only for phase fluctuations.

3. The method for maximizing the power transmitted between a first and a second telescope of claim 1, wherein the adaptive optical systems of both the first and second telescopes compensates only for phase fluctuations.

* * * * *